Krogh & Hogness.
Raising Sunken Vessels.
No. 1,392. Reissued Feb. 3, 1863.
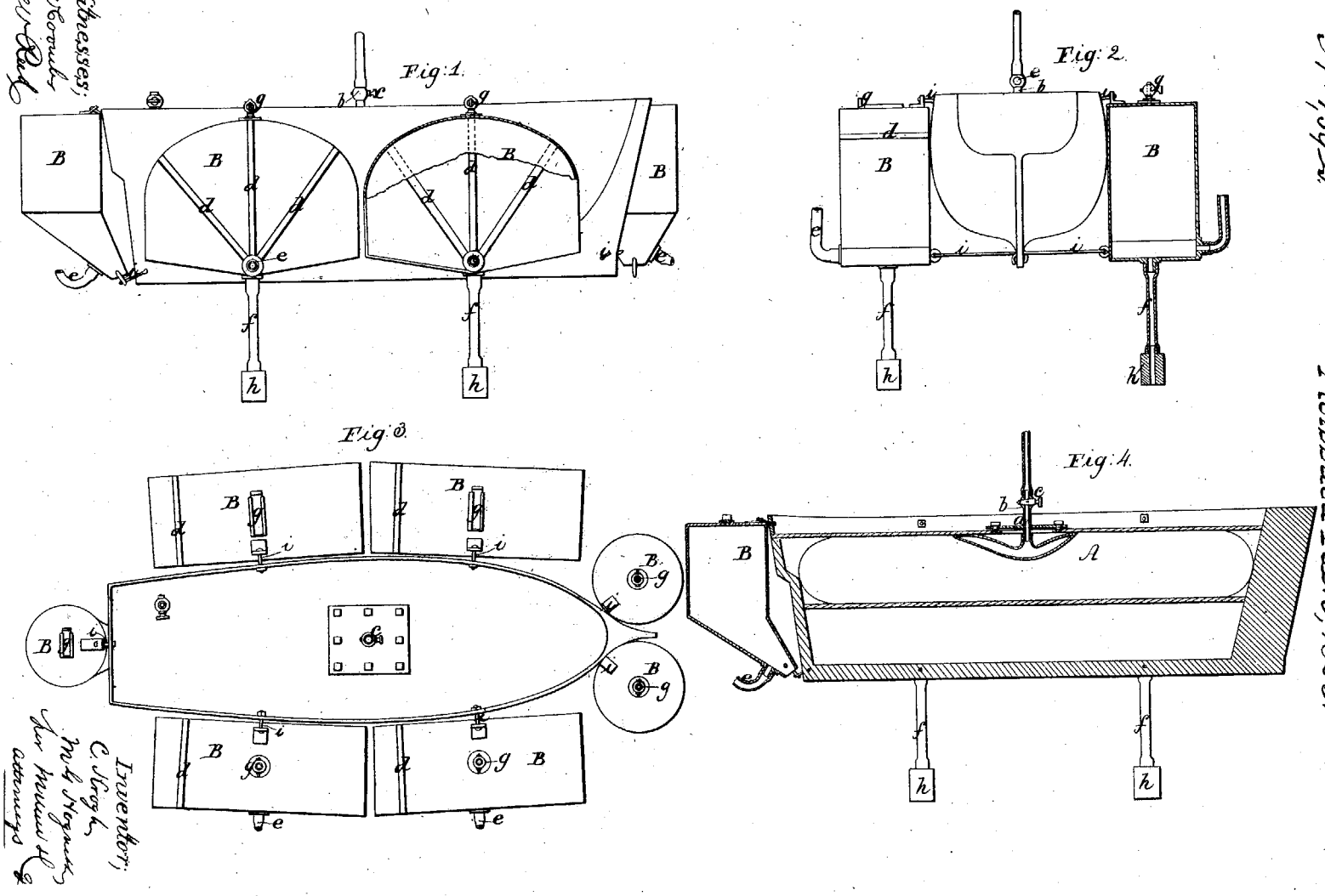
Witnesses;
J. W. Coombs
Geo. W. Reed
Inventor;
C. Krogh
M. L. Hogness
per Munn & Co.
Attorneys
N. PETERS, PHOTO-LITHOGRAPHER, WASHINGTON, D. C.

UNITED STATES PATENT OFFICE.

CASPER KROGH AND M. G. HOGNESS, OF KROGHVILLE, WISCONSIN.

IMPROVED MODE OF RAISING SUNKEN VESSELS.

Specification forming part of Letters Patent No. 36,718, dated October 21, 1862; Reissue No. 1,392, dated February 3, 1863.

*To all whom it may concern:*

Be it known that we, CASPER KROGH and M. G. HOGNESS, of Kroghville, in the county of Jefferson and State of Wisconsin, have invented certain new and useful Improvements in the Mode of Raising Sunken Vessels and of Preventing Damaged Vessels from Sinking; and we do hereby declare that the following is a full, clear, and exact description thereof, reference being had to the accompanying drawings, which form a part of this specification.

In the aforesaid drawings, Figure 1 represents a side view partly in section, illustrating the application of our invention in raising a sunken vessel. Fig. 2 is a view looking toward the stern of the vessel. Fig. 3 is a plan view of the same. Fig. 4 represents a longitudinal vertical section of the vessel, showing the application of this invention in floating damaged vessels.

Similar letters of reference indicate the corresponding parts of our invention in the several figures.

This invention consists in preventing damaged vessels from sinking, and raising sunken vessels by placing air-tight bags or chambers of some flexible material within them and attaching inflexible air-tight chambers or floats outside of them, and then forcing air into said air-tight chambers and bags, which may be used either separately or in combination with each other.

It also consists in the arrangement of the openings for the introduction of the air into said chambers or floats at or near the bottom thereof.

It also consists in the arrangement of other openings in the bottom of said chambers or floats for the expulsion of the water therefrom, so that after the air is introduced and the water expelled the water outside will effectually seal in the air and prevent its escaping from the chambers or floats.

It further consists in the attachment to the last above mentioned openings or flexible pipes provided with hollow weights at their lower ends, by which the outer orifices are kept below the body of the float in case the latter should get displaced during their operation.

To enable others skilled in the art to make and use our invention, we will now proceed to describe it with particularity, reference being had to the drawings.

To prevent the sinking of damaged vessels, we propose to employ bags or chambers of air-tight flexible material—such as india-rubber, cloth, or oiled cloth—within the vessel, using as many as may be convenient, each provided with a faucet whereby to fill it, to confine the air within it when full, and to permit the air to escape from it when necessary. These bags or chambers should be made of a form substantially to fit the parts, compartments, cabins, and apartments of the vessel which they are designed to occupy. In Fig. 4 only one bag is shown, as that is sufficient to illustrate our invention. Each bag A is provided with a tube fastened permanently in it, marked *a*, to which another tube, *b*, is screwed provided with a stop-cock, *c*, or its equivalent, and passing through a suitable opening in the deck or other part of the vessel to connect with a blowing apparatus arranged above the deck for the purpose of inflating the several bags employed. The connections of the bags with the blowing apparatus should be by metallic or flexible pipes arranged on deck in such a manner as to be out of the way and well protected from accidental injury. In vessels with two or more decks the bags may be arranged in the lower as well as the upper apartments. The bags can be kept rolled up or spread out flat under the ceiling, as may be most convenient for storage, until required to be used.

The several bags should have a capacity in the aggregate equal to about one-fourth more than that of that portion of the hull below the level of the water outside which is unoccupied by cargo. In a vessel without side rooms there should be provided partitions between the bags lengthwise of the vessel, to keep the bags in their places and prevent their being tipped or tilted over.

The several bags should always be kept in connection with the main pipes and thereby with the blowing apparatus, and whenever the vessel, from any cause whatever, becomes damaged so as to become liable to founder or sink, the said bags should be loosened from their storage-places and inflated with air, and when filled the air should be confined within them by means of the stop-cocks.

It some cases it may be desirable to use, in connection with the bags aforesaid, for saving damaged vessels from sinking, small outside lifters, similar in nature and principle to those we propose to use for raising sunken vessels, which we will now proceed to describe.

B B are the outside floats or lifters consisting of vessels of any convenient shape, or of various shapes, so as to conform with and fit the conformation of different parts of the exterior of the hull of the vessel. These lifters may be made of sheet-iron of any suitable thickness, and may be strengthened by the bands *d d*, extending in such directions as may be desirable. Each of said outside inflexible chambers or lifters is provided with one or more openings at or near the bottom for the admission of air through the pipes or tubes *e e*, one or more openings in the bottom for the expulsion of water, and one or more openings at the top to provide for the escape of air from the lifters when it is desired to sink them, each of the last mentioned openings being furnished with a stop-cock or valve, *g*, of any suitable kind, to close them when the lifters are desired to rise. The pipes *f f*, which may frequently be attached very advantageously to the openings for the expulsion of water in the bottom of the lifters, should be of india-rubber or some other flexible material, and should have hollow weights *h h* attached to their lower ends to keep their mouths below the bottom of the lifter, such weights also serving as a sort of ballast to keep the lifter right side up. These lifters may be furnished with suitable rings or hooks to attach them to a sunken vessel by chains passing under the bottom thereof, or with hooked rods *i i* to attach them to the keel and sides of the vessel, as shown in the drawings.

To employ the lifters B B in raising a sunken vessel, they must be carried on board of a suitable vessel or vessels, or floated and towed to the place where the sunken vessel lies, and are there sunk or lowered down by means of cables or ropes by opening the cocks or valves *g g*, and thus by allowing the air to escape from the top admitting the water to enter through the aforesaid openings in the bottom and fill them. The lifters having been lowered to the proper positions and made fast to the vessel by means of the chains or hooks provided for the purpose, are connected by the pipes *e e* with a blowing apparatus on a floating vessel conveniently anchored, and the cocks or valves *g g* having been closed, the blowing apparatus is put in operation and the lifters are gradually filled with air, which, rising into the upper portions thereof, forces the water out at the bottom through the openings therein made for that purpose and the pipes *f f*, when the same are used, until the lifters have buoyancy enough to raise the sunken vessel. It would be well, however, before commencing to inflate the lifters that each one, after having been secured as aforesaid, should have a little air forced in to bring it into a proper upright position.

In case one end of the vessel should rise before the other and the lifters should consequently be tilted up from their intended position, the weights *h h* keep the lower orifices of the pipes *f f* below the lowest part of the lifter, for the pipes *f f* should be of sufficient length to effect this and so prevent the escape of any air through the said pipes. These pipes are necessary only with long lifters, and are designed to obviate any inconvenience which might arise in the employment of lifters of considerable horizontal length from the tilting up from any cause of one end of said lifter, which, unless obviated by the said pipes *f f*, might cause a portion of the air to escape the orifices for the expulsion of water. Lifters of great horizontal length should, perhaps, have one of such openings at or near each end, when the said pipes should be of about the same length as the lifter; but if only one opening is made near the center, then said pipes need be only about one-half the length of the said lifter; but if said long lifters can by any means be kept in a horizontal position then the pipes *f f* would not be necessary.

In raising a vessel from very deep water lifters of the same kind may be fastened to the rigging and deck, which would keep it in an upright position, and when the vessel has been raised near the surface more lifters can be placed lower down for the purpose of floating the vessel into harbor or dock. When bags or flexible chambers, such as have been herein described, for preventing damaged vessels sinking can be placed in the sunken hull and cabins, they may be used with advantage in aiding the operation of the lifters. When these bags or chambers are used an opening should be made in the bottom or lower part of the vessel for the expulsion of the water by the inflation of said bags or chambers.

When the outside lifters and the flexible chambers are applied in size and number according to the weight to be raised, the largest ship with its cargo can be raised without the application of any greater power than that necessary to inflate the lifters and flexible chambers with air.

What we claim as our invention, and desire to secure by Letters Patent, is—

1. The employment of inflexible lifters applied outside of the vessel when arranged, constructed, and operating substantially as and for the purposes set forth.

2. The employment of the flexible chambers side the vessel, for preventing damaged vessels from sinking, when constructed and operated substantially as herein delineated and described.

3. The arrangement of the connections of the air-pipes for the admission of air into the lifters at or near the bottom thereof, substantially as and for the purposes herein delineated and set forth.

4. The weighted flexible pipes *f f*, applied . o the lifters and operated substantially as and for the purposes herein shown and described.

CASPER KROGH.
M. G. HOGNESS.

Witnesses:
W. E. MAUS,
W. F. MILLER.